US008379596B2

(12) United States Patent
Lee

(10) Patent No.: US 8,379,596 B2
(45) Date of Patent: Feb. 19, 2013

(54) REQUESTING MAC CONTEXT INFORMATION FROM NEIGHBOR BASE STATIONS

(75) Inventor: Hyunjeong Hannah Lee, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 533 days.

(21) Appl. No.: 11/776,146

(22) Filed: Jul. 11, 2007

(65) Prior Publication Data

US 2009/0016297 A1 Jan. 15, 2009

(51) Int. Cl.
*H04W 4/00* (2009.01)

(52) U.S. Cl. ........ 370/331; 370/328; 370/332; 370/333; 455/436; 455/437; 455/438; 455/439; 455/442; 455/443; 455/444

(58) Field of Classification Search .......... 455/436–444; 370/328, 331–333
See application file for complete search history.

(56) References Cited

U.S. PATENT DOCUMENTS

| | | | |
|---|---|---|---|
| 6,609,003 B1 * | 8/2003 | Park et al. | 455/436 |
| 7,233,583 B2 * | 6/2007 | Asthana et al. | 370/332 |
| 7,388,851 B2 * | 6/2008 | Trossen | 370/331 |
| 7,418,264 B2 * | 8/2008 | Kim | 455/436 |
| 7,450,909 B2 * | 11/2008 | Cho et al. | 455/67.11 |
| 7,542,449 B2 * | 6/2009 | Kim et al. | 370/331 |
| 7,570,618 B2 * | 8/2009 | Son et al. | 370/331 |
| 7,593,731 B2 * | 9/2009 | Lim et al. | 455/436 |
| 7,603,121 B2 * | 10/2009 | Kim et al. | 455/436 |
| 7,657,268 B2 * | 2/2010 | Oswal et al. | 455/456.3 |
| 7,693,513 B2 * | 4/2010 | Chou | 455/418 |
| 7,720,473 B2 * | 5/2010 | Kim et al. | 455/432.1 |
| 8,125,954 B2 * | 2/2012 | Wu | 370/331 |
| 2005/0195786 A1 * | 9/2005 | Shpak | 370/338 |
| 2005/0272403 A1 * | 12/2005 | Ryu et al. | 455/403 |
| 2006/0159047 A1 * | 7/2006 | Olvera-Hernandez et al. | 370/331 |
| 2006/0229075 A1 * | 10/2006 | Kim et al. | 455/436 |
| 2006/0276189 A1 * | 12/2006 | Kiernan et al. | 455/436 |
| 2007/0168577 A1 * | 7/2007 | Kim et al. | 710/15 |
| 2007/0291695 A1 * | 12/2007 | Sammour et al. | 370/331 |
| 2008/0119186 A1 * | 5/2008 | Song et al. | 455/436 |
| 2008/0254802 A1 * | 10/2008 | Ohta et al. | 455/440 |

FOREIGN PATENT DOCUMENTS

WO  WO 2005122622 A1 * 12/2005

OTHER PUBLICATIONS

U.S. Appl. No. 60/854,468, filed Oct. 15, 2006, Wong et al.
U.S. Appl. No. 60/855,696, filed Oct. 30, 2006, Lee et al.
U.S. Appl. No. 60/854,465, filed Oct. 25, 2006, Wong et al.
U.S. Appl. No. 60/854,466, filed Oct. 25, 2006, Sydir et al.

(Continued)

*Primary Examiner* — Olumide T Ajibade Akonai
(74) *Attorney, Agent, or Firm* — Trop, Pruner & Hu, P.C.

(57) ABSTRACT

A technique to reduce the service disruption time of a mobile station (MS) when the MS performs a hard handover (HHO) is provided. An MS receives MAC context information that is necessary to connect to the target base station (BS) through the serving BS during the HHO preparation time instead of HHO execution time. The HHO preparation phase refers to the stage where a handover is initiated but the MS is still connected with the current serving BS. On the other hand, once the HHO execution begins, the MS must disconnect from the serving BS in order to establish the communication with the target BS.

19 Claims, 3 Drawing Sheets

OTHER PUBLICATIONS

U.S. Appl. No. 60/854,470, filed Oct. 25, 2006, Sydir et al.
U.S. Appl. No. 11/694,982, filed Mar. 31, 2007, Gupta et al.
U.S. Appl. No. 11/618,642, filed Dec. 29, 2006, Venkatachalam et al.
U.S. Appl. No. 11/690,230, filed Mar. 27, 2007, Venkatachalam et al.
U.S. Appl. No. 60/852,920, filed Oct. 17, 2006, Ahmadi et al.
U.S. Appl. No. 11/731,744, filed Mar. 3, 2007, Gupta et al.
U.S. Appl. No. 11/591,191, filed Oct. 31, 2006, Taaghol et al.
U.S. Appl. No. 11/419,455, filed May 19, 2006, Venkatachalam et al.
U.S. Appl. No. 11/231,005, filed Sep. 16, 2005, Qi et al.
IEEE 802.21 Media Independent Handover, power point presentation, 31 pages.
WiMAX Forum, WiMAX Forum Network Architecture, Stage 2: Architecture Tenets, Reference Model and Reference Points, Part 2, Release 1.0.0, Mar. 28, 2007.
M. Lax et al., WiMAX—A Study of Mobility and a MAC-layer Implementation in GloMoSim, Umea University, Department of Computing Science, Apr. 6, 2006.
IEEE Standard for Local and Metropolitan Area Networks, Part 16: Air Interface for Fixed and Mobile Broadband Wireless Access Systems, Amendment 2: Physical and Medium Access Control layers for Combined Fixed and Mobile Operation in Licensed Band and Corrigendum 1, IEEE Computer Society and IEEE Microwave Theory and Technique Society, Feb. 28, 2006.

\* cited by examiner

REQUESTING MAC CONTEXT INFORMATION FROM NEIGHBOR BASE STATIONS

BACKGROUND

Description of the Related Art

WiMAX is an acronym that stands for Worldwide Interoperability for Microwave Access, which is a certification mark for products that pass conformity and interoperability tests for the IEEE 802.16 standard. Wireless broadband access networks, sometimes referred to as WiMAX, generally include one or more base stations (BSs) and one or more mobile wireless stations (MSs).

During operation an MS may transition from a current serving BS to a target BS for various reasons, for example, degraded link characteristics, differing quality of service, and the like. With some types of data and applications, for example, voice over IP (VoIP) and multimedia, transitions between BSs may interrupt service using current techniques due to a series of network re-entry procedures. It is desirable to minimize service disruption time short enough so that performance degradation of delay sensitive applications is unnoticeable.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DESCRIPTION OF THE EMBODIMENT(S)

Figure 1:
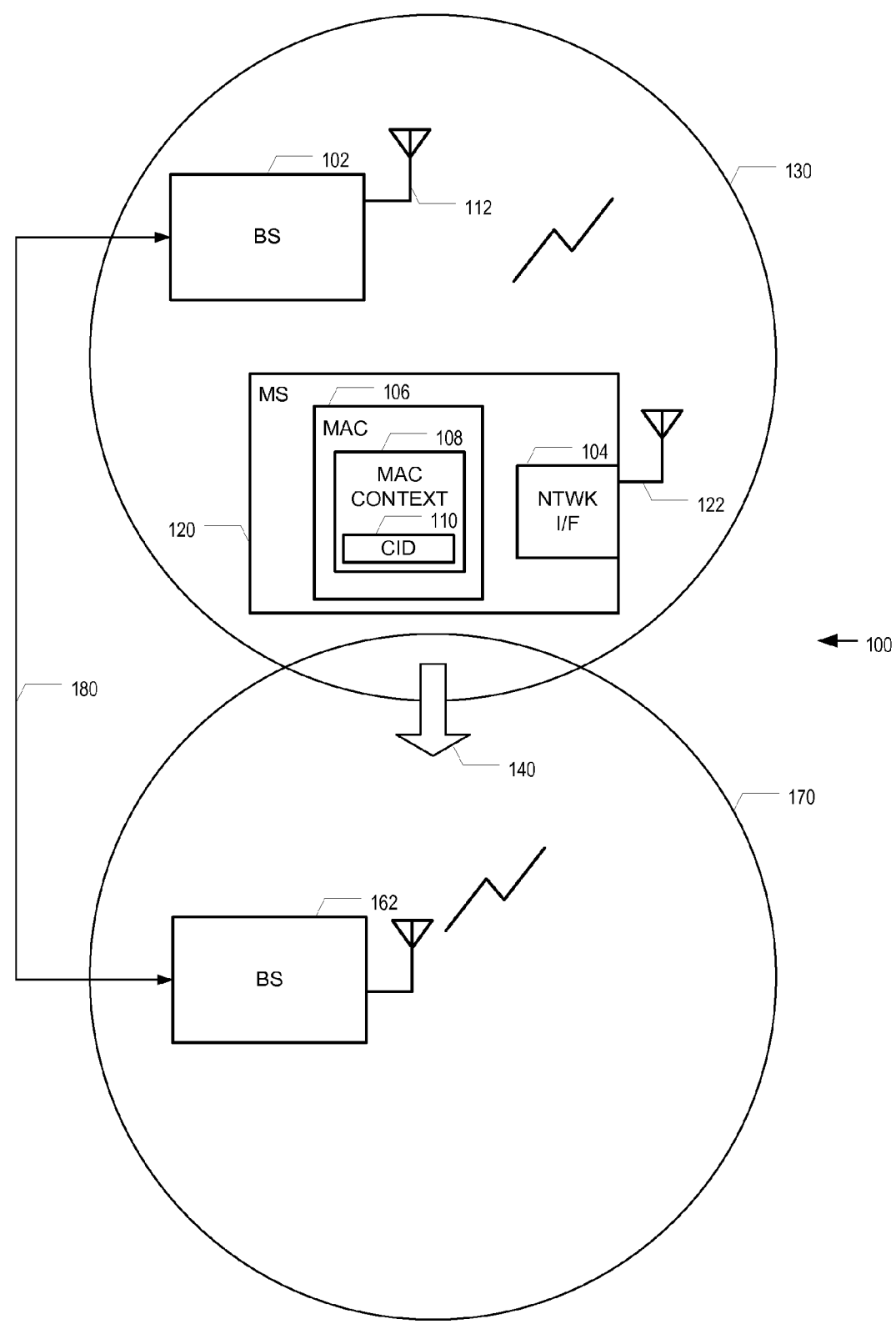
FIG. 1 illustrates a wireless network operating environment according to some embodiments of the present invention.

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computing platform" may comprise one or more processors.

According to current WiMAX based systems, when a mobile station (MS) switches from a current cell with a current serving base station (BS) to a target cell with a target BS through the process of a hard handover (HHO), the MS disconnects from the current BS and performs a series of network re-entry procedures in order to connect with the target BS. During the HHO, there is a service disruption during which the MS cannot send or receive data traffic. It is important to minimize the service disruption such that the performance degradation of delay sensitive applications, for example, voice over IP (VoIP), is unnoticeable.

Once the MS moves to the target cell, according to the current WiMAX network re-entry procedures, the MS needs to obtain uplink (UL) and downlink (DL) channel parameters and achieve PHY adjustment through a handover ranging process. Once the PHY adjustment is achieved with the target BS, the MS exchanges MAC management messages with the target BS in order to update MAC context information. The current WiMAX MAC context update procedure includes RNG-REQ/RSP, SBC-REQ/RSP, Authorization, and REG-REQ/RSP message exchanges. In order to reduce the service disruption time, the current WiMAX protocol employs several techniques. First, the MS can omit the handover ranging process only if the MS has learned the channels before the HHO and the channels are still valid. However, in practice, the MS can hardly assume the previous learning is valid during its actual HHO due to channel dynamics and synchronization requirement. Therefore, the actual PHY measurement and adjustment with the target BS at the time of handover is unavoidable in many cases. Second, WiMAX protocol provides for handover optimization, through which all the MAC context update steps can be combined into one step and thus the MS is required to exchange only RNG-REQ/RSP with the target BS. Specifically, the content of SBC-RSP and REG-RSP messages are encoded as TLV information of the RNG-RSP message. Further, the target BS may be informed via backbone communication in advance and thus may be ready (for example, by preparing resources) to accept the MS when it tries to connect with the target BS. Even with these current provisions, it is desirable to further reduce synchronization latency during HHO.

According to an embodiment of the present invention, a technique to improve the synchronization timing of an MS when the MS performs a hard handover (HHO) is provided.

FIG. 1 illustrates a wireless network operating environment 100 in accordance with some embodiments of the present invention. In some embodiments, network operating environment 100 includes a base station (BS) 102 and one or more mobile stations 120 that communicate with BS 102 in a wireless cell 130. Wireless cell 130 may be any type of wireless network, including networks that comply with the Mobile WiMAX, IEEE 802.16e, IEEE 802.16m, 3GPP LTE, 3GPP2 AIE, IEEE 802.20 or other wireless network standards. In some orthogonal frequency division multiplexing (OFDM) and orthogonal frequency division multiple access (OFDMA) embodiments, base station 102 and mobile stations 120 may communicate using multicarrier communication signals comprising a plurality of subcarriers.

Mobile station 120 may include a wireless network interface 104 and a MAC (Media Access and Control) component 106. MAC 106 may include correct MAC context information 108 including connection identifiers 110 for target base station 162 prior to disconnecting from serving BS 102. MAC 106 may include other elements (e.g., an UL or a DL scheduler) that are not necessary for an understanding of the embodiments and are therefore not shown to avoid obscuring the description of the embodiments.

In some embodiments, base station 102 may be a wireless access point (AP), such as a Worldwide Interoperability for Microwave Access (WiMax), or broadband communication station, although the scope of the invention is not limited in this respect as base station 102 may be part of almost any wireless communication device. In some embodiments, base station 102 may be a communication station, such as WiMax, or broadband wireless access (BWA) network communication station, although the scope of the invention is not limited in this respect.

Mobile station (MS) 120 may be any type of device that desires to access wireless cell 130 through BS 102. In some embodiments, mobile station 120 may be part of a portable wireless communication device, such as personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, base station 102 may be referred to as a transmitting station and mobile station 120 may be referred to as a receiving station or subscribing station, however base station 102 may have receiving capability and mobile station 120 may include transmitting capability. Although base station 102 and mobile station 120 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of base station 102 and mobile station 120 may refer to one or more processes operating on one or more processing elements.

In some embodiments, base station 102 and mobile station 120 may communicate in accordance with specific communication standards, such as the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions.

Antennas 112 of BS 102 and antennas 122 of MS 120 may comprise directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some embodiments, antennas 112 and/or antennas 122 may be effectively separated to take advantage of spatial diversity and the different channel characteristics that may result between each of antennas 112 of base station 102 and each of antennas 122 of mobile station 120.

During operation MS 120 may transition from communicating with BS 102 in cell 130 to communicating with BS 162 in target cell 170 for various reasons, for example, degraded link characteristics as MS 120 moves in the direction of arrow 140. Such a transition may be initiated by BS 102 or MS 120. BS 102 and BS 162 may be connected via wired backbone 180 or a wireless interface, not shown. According to an embodiment of the present invention, MS 120 possesses the correct MAC context information to communicate with BS 162 prior to disconnecting from BS 102 using minimal control message overhead and thus the MAC context update steps are no longer needed when MS 120 moves to cell 170 and connects with BS 162. Specifically, a MAC readiness process at MS 120 for the target cell 170 is added into the HHO preparation phase. The HHO preparation phase refers to the stage where a handover is initiated but MS 120 is still connected with BS 102.

All the existing handover procedure and optimization techniques assume that the MAC context information can be updated at MS 120 only after the PHY adjustment is completed with the target BS 162. This assumption is true if MS 120 initially enters the network, that is, MS 120 has not previously communicated with any BS. Therefore, without achieving PHY adjustment with a BS, MS 120 cannot communicate at all. Because the existing handover procedure was defined based on the existing network entry procedure, it was designed as if the condition still needs to be met. However, the assumption is not necessarily true because the handover process is a transitioning procedure instead of a new entering procedure. That is, the PHY readiness of MS 120 in target cell 170 may not necessarily be a prerequisite for the MAC readiness of MS 102 in target cell 170 in a transitioning procedure. Therefore, the MAC readiness of MS 120 in target cell 170 can be completed in advance for the HHO while MS 120 is still connected with BS 102. In this way, the steps to re-enter the network after the disconnection are reduced and thus the service disruption time can be greatly reduced. Specifically, MS 120 has updated MAC context information including connection identifiers from target BS 162 prior to disconnecting from BS 102.

Specifically, MAC context information includes connection identifier update, capability negotiation information, and registration information used between target BS 162 and MS 120. In the current WiMAX protocol, connection identifier update is encoded as TLV values in RNG_RSP. Capability negotiation information as TLV values of SBC-REQ/RSP includes supported duplex mode, protocol data unit construction method, transmission power capability, modulator/demodulator configuration, authorization policy, handover trigger metric that can be used, etc. registration information as TLV values of REG_REQ/RSP includes management features supported, security association update, mobility features supported, etc. Even though it is possible that some values of capability negotiation information and registration information change as a result of a handover, in many cases, the values remain after handover. On the other hand, connection identifiers must change as a result of handover.

Figure 2:
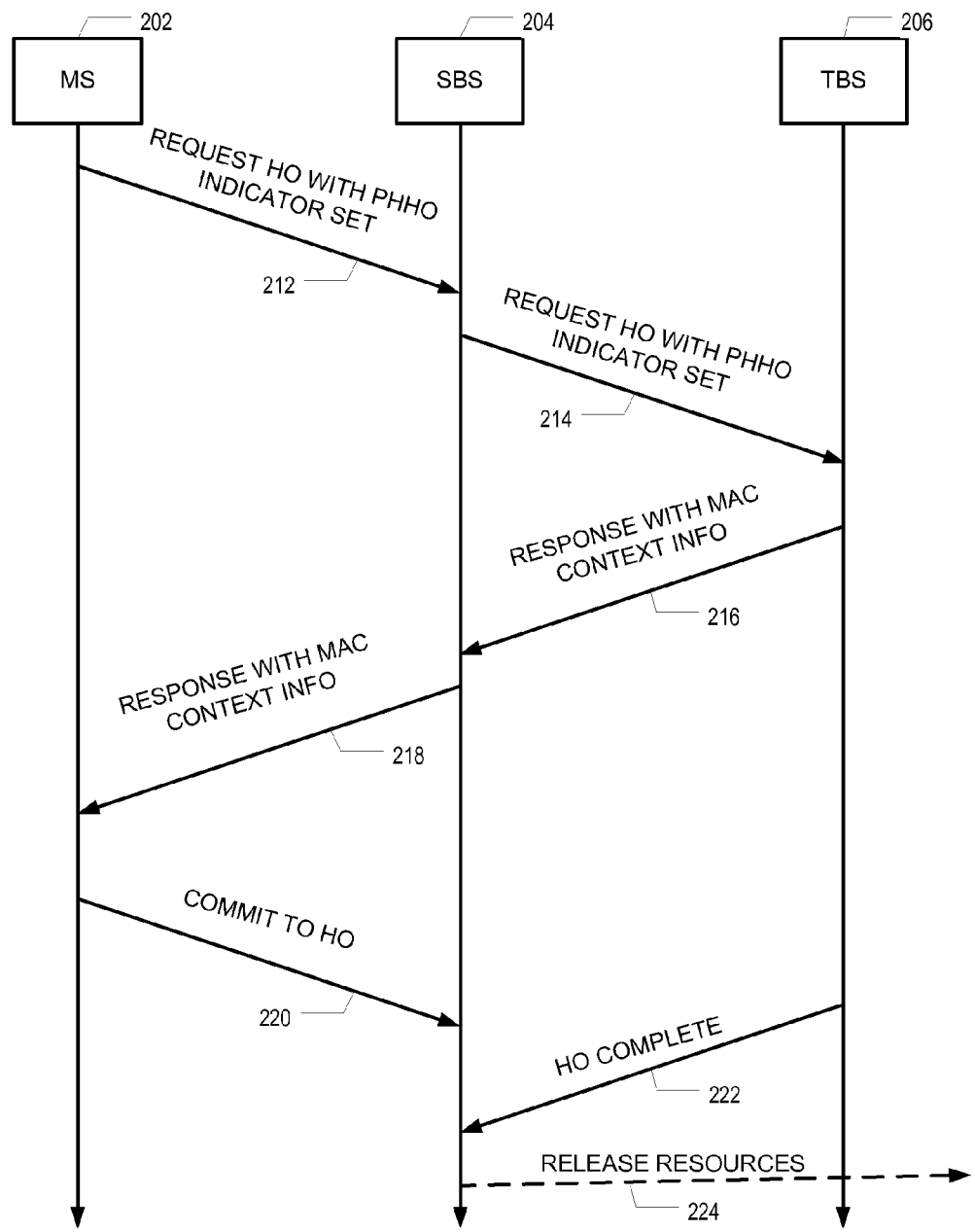
FIG. 2 illustrates a message sequence for minimizing service disruption time according to an embodiment of the present invention.

FIG. 2 illustrates a message sequence for minimizing service disruption time according to an embodiment of the present invention. During the HHO preparation phase, an MS 202 initiates a handover by sending a handover request message to serving BS 204, at transmission 212. The handover request message may be similar to current WiMAX message MOB_MSHO-REQ, however, it further includes a PHHO indicator. By setting the PHHO indicator, MS 202 is requesting to receive MAC context information and connection identifiers for potential target BSs prior to disconnecting from serving BS 204. The information is all or some, depending on the level of handover optimization desired, of the TLV encoded information typically received in the RNG-RSP, SBC-RSP, and REG-RSP messages after an MS has connected to a target BS.

Upon receiving the handover request message, the serving BS 204 contacts one or more potential target BSs 206 to query about resource status, assign connection identifiers and prepare MAC readiness at transmission 214. Target BS 206 provides a response with service level prediction for MS 202 attempting the handover, assigned connection identifier(s) and other MAC context information as required at transmission 216. Upon receiving the response from the one or more potential target BSs 206, serving BS 204 sends MS 202 the received information from the potential target BSs 206 at transmission 218. The handover response message may be similar to current WiMAX message MOB_BSHO-RSP, however, it further includes connection identifiers and other MAC context information, if any.

MS 202, upon selection of a target BS, then disconnects from BS 204 by transmitting a commit to handover message, at transmission 220. The commit to handover message may be similar to current WiMAX message MOB_HO-IND. Upon sending this message, MS 202 finishes the HHO preparation phase and then begins HHO execution. The service disruption time begins after this message is sent, however, re-connection time is minimized according to embodiments of the present invention because MS 202 already possesses MAC context information including updated connection identifiers for the target BS.

MS 202 may begin data communication with the target BS using the received connection identifiers as soon as it achieves PHY adjustment. That is, MS 202 only needs to perform PHY synchronization and adjustment during the service disruption time with the selected target BS 206. As the target BS 206 notices the successful network attachment of MS 202, BS 206 sends a handover completion indication to the old serving BS 204 at transmission 222. Thus, the old serving BS 204 can send the indication to other potential target BSs (if any) that were not chosen as a new serving BS so that they can release their reserved resources, at transmission 224.

Figure 3:
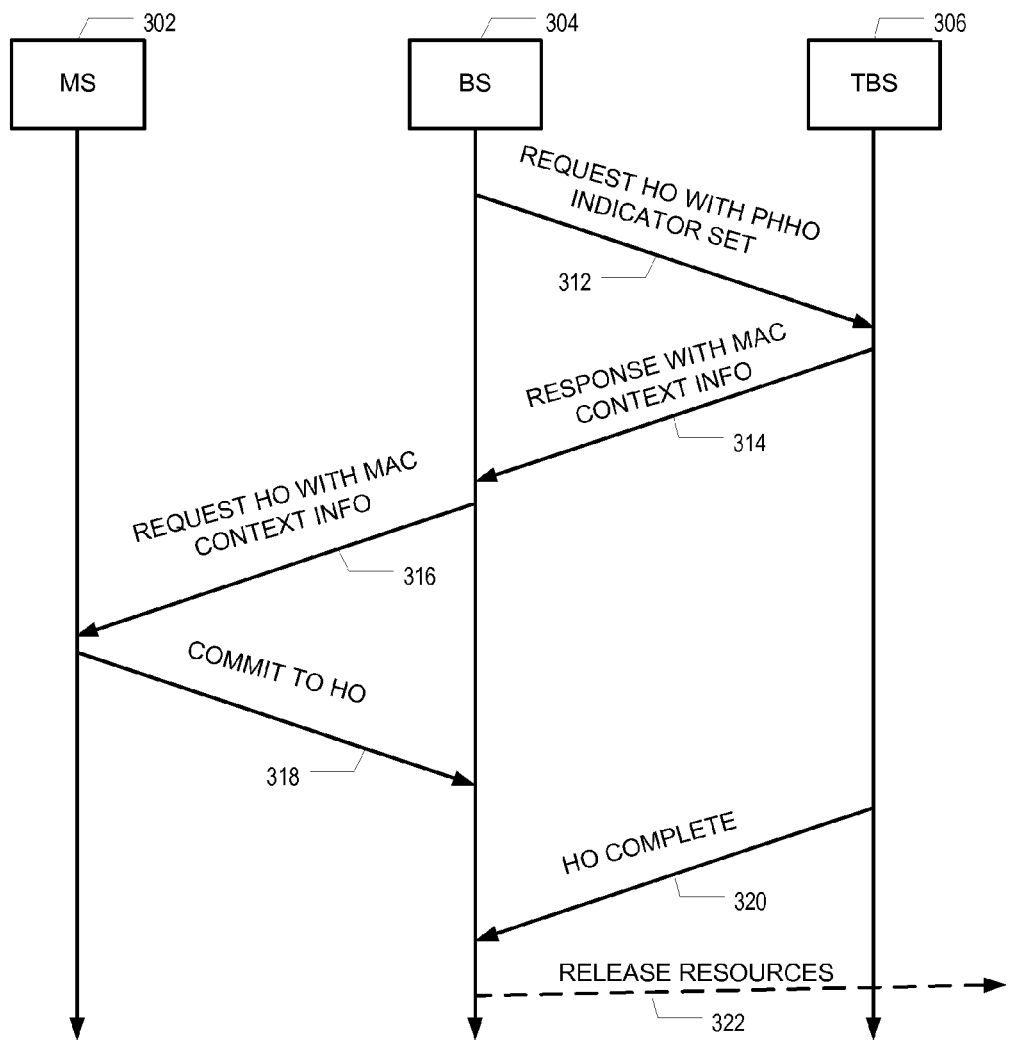
FIG. 3 illustrates an alternate message sequence for minimizing service disruption time according to an embodiment of the present invention.

FIG. 3 illustrates an alternate message sequence for minimizing service disruption time according to an embodiment of the present invention. During the HHO preparation phase, a serving BS 304 can initiate a handover. First, serving BS 304 contacts one or more potential target BSs 306 to query about resource status, assign connection identifiers and prepare MAC readiness at transmission 312. Target BS 306 provides a response with service level prediction for MS 302 attempting the handover, assigned connection identifier(s) and other MAC context information as required at transmission 314. Upon receiving the response from the one or more potential target BSs 306, serving BS 304 sends MS 302 a handover request message with the received information from the potential target BSs 306 at transmission 316. The handover request message may be similar to current WiMAX message MOB_BSHO-REQ, however, it further includes connection identifiers and other MAC context information, if any.

MS 302, upon selection of a target BS, then disconnects from serving BS 304 by transmitting commit to handover message, at transmission 318. The commit to handover message may be similar to current WiMAX message MOB_HO-IND. Upon sending this message, MS 302 finishes the HHO preparation phase and then begins HHO execution. The service disruption time begins after this message is sent, however, re-connection time is minimized according to embodiments of the present invention because MS 302 already possesses MAC context information including updated connection identifiers for the target BS.

MS 302 may begin data communication with the target BS using the received connection identifiers as soon as it achieves PHY adjustment. That is, MS 302 only needs to perform PHY synchronization and adjustment during the service disruption time. As the target BS 306 notices the successful network attachment of MS 302, BS 306 sends a handover completion indication to the old serving BS 304 at transmission 320. Thus, the old serving BS 304 can send the indication to other potential target BSs (if any) that were not chosen as a new serving BS so that they can release their reserved resources, transmission 322.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks.

The techniques described above may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few. A typical computing system includes at least one processing unit, associated memory and a number of input/output (I/O) devices. A computing system processes information according to a program and produces resultant output information via I/O devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A method comprising:
   requesting a current base station to provide a mobile station with control context information for a neighbor base station prior to the mobile station disconnecting from a current base station and prior to handover of the mobile station to the neighbor base station, said context information including at least one of supported duplex mode, protocol data unit construction method, transmission power capability, modulator/demodulator configuration, and authorization policy.

2. The method as recited in claim 1, further comprising providing the medium access control context information of the neighbor base station to the mobile station with a request for a handover.

3. The method as recited in claim 1, further comprising providing the medium access control context information of the neighbor base station to the mobile station with a response to a request for a handover.

4. The method as recited in claim 1, further comprising requesting additional medium access control context information for an alternate neighbor base station for the mobile station prior to the mobile station disconnecting from the current base station.

5. The method as recited in claim 4, further comprising providing the medium access control context information for the neighbor base station and the additional medium access control context information for the alternate neighbor base station to the mobile station with a request for a handover.

6. The method as recited in claim 5, further comprising upon selection and connection to the neighbor base station or the alternate neighbor base station by the mobile station, receiving a handover completion notification.

7. The method as recited in claim 6, further comprising upon receiving the handover completion notification, sending notification to release the resources of a non-selected neighbor base station.

8. The method as recited in claim 4, further comprising providing the medium access control context information for the neighbor base station and the additional medium access control context information for the alternate neighbor base station to the mobile station with a response to a request for a handover.

9. The method as recited in claim 1, wherein the mobile station and the current base station communicate wirelessly.

10. The method as recited in claim 1, wherein the medium access control context information includes connection identifiers for a connection between the mobile station and the neighbor base station.

11. A non-transitory machine-readable medium having machine executable instructions for performing a method, the method comprising:
    requesting a current base station to provide a mobile station with control context information for a neighbor base station prior to the mobile station disconnecting from a current base station and prior to handover of the mobile station to the neighbor base station, said context information including at least one of supported duplex mode, protocol data unit construction method, transmission power capability, modulator/demodulator configuration, and authorization policy.

12. The machine-readable medium as recited in claim 11, the method further comprising providing the medium access control context information of the neighbor base station to the mobile station with a request for a handover.

13. The machine-readable medium as recited in claim 11, the method further comprising providing the medium access control context information of the neighbor base station to the mobile station with a response to a request for a handover.

14. The machine-readable medium as recited in claim 11, the method further comprising requesting additional medium access control context information for an alternate neighbor base station for the mobile station prior to the mobile station disconnecting from the current base station.

15. The machine-readable medium as recited in claim 14, the method further comprising providing the medium access control context information for the neighbor base station and the additional medium access control context information for the alternate neighbor base station to the mobile station with a request for a handover.

16. The machine-readable medium as recited in claim 15, the method further comprising upon selection and connection to the neighbor base station or the alternate neighbor base station by the mobile station, receiving a handover completion notification.

17. The machine-readable medium as recited in claim 16, the method further comprising upon receiving the handover completion notification, sending notification to release the resources of a non-selected neighbor base station.

18. The machine-readable medium as recited in claim 14, the method further comprising providing the medium access control context information for the neighbor base station and the additional medium access control context information for the alternate neighbor base station to the mobile station with a response to a request for a handover.

19. The machine-readable medium as recited in claim 11, wherein the medium access control context information includes connection identifiers for a connection between the mobile station and the neighbor base station.

* * * * *